United States Patent Office 3,483,243
Patented Dec. 9, 1969

3,483,243
PREPARATION OF 1-CHLORO-2-
ISOCYANATOCYCLOHEXANE
James L. Harper, Laurel, and Alan H. Thomas, Baltimore, Md., assignors to W. R. Grace & Co., New York, N.Y., a corporation of Connecticut
No Drawing. Original application July 22, 1964, Ser. No. 384,543, now Patent No. 3,338,944, dated Aug. 29, 1967. Divided and this application May 17, 1967, Ser. No. 651,066
Int. Cl. C07c *119/04*
U.S. Cl. 260—453     5 Claims

ABSTRACT OF THE DISCLOSURE

In the abstract, this invention is directed to a process for producing 1-chloro-2-isocyanatocyclohexene comprising reacting cyclohexene in an inert organic diluent with isocyanic acid and tertiary butyl hypochlorite.

CROSS REFERENCE TO RELATED APPLICATIONS

This is a divisional of application Ser. No. 384,543, filed July 22, 1964 and now U.S. Patent No. 3,338,944. Said application Ser. No. 384,543 was a continuation-in-part of application Ser. No. 181,161, filed March 20, 1962 with which it (said application Ser. No. 384,543) was copending. Said application Ser. No. 181,161 is now abandoned.

This invention relates to organic isocyanates and to a method for preparing the same.

Numerous organic isocyanate compounds are known to the art. They have a wide variety of uses in the arts relating to the resins; plastics; coatings; insecticides; adhesives; and modification of fibers, sheets and films composed of cloth, leather and paper. A variety of methods for producing organic isocyanates are also well known to the art. Such methods include, for example, the reaction of amines or amine salts with phosgene, the Curtius rearrangement of an azide in a neutral solvent, the Hoffman rearrangement amides, the Lossen rearrangement of hydroxamic acids and the double decomposition reaction between an organic halide or sulfate and an alkali metal cyanate. More recent proposals include the reaction of organic isocyanides and ozone.

It is an object of this invention to provide a new and simplified method for preparing organic isocyanates. It is another object of this invention to provide hitherto unknown isocyanates. Still other objects will become apparent to those skilled in the art in view of the more detailed disclosure which follows.

The novel isocyanates of this invention contain at least one group having the structural formula $$\text{Formula I} \quad \left[ \begin{array}{ccc} R_1 & R_2 & R_3 \\ | & | & | \\ -C - C - C - \\ | & | & | \\ H & HCO & Cl \end{array} \right]$$

where $R_1$, $R_2$, and $R_3$ can be hydrogen, alkyl, aryl, aralkyl or alkaryl radicals but preferable are hydrogen or lower alkyl (1 to 7 carbon atoms, inclusive) radicals. These new isocyanates are prepared by reacting an organic aliphatic or cycloaliphatic olefinically unsaturad compound containing at least one group of the formula

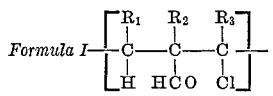

(where $R_1$, $R_2$, and $R_3$ are the same as above) with at least one mole of isocyanic acid and at least one positive chlorine equivalent of a positive halogen yielding compound for each of said groups. Typical positive halogen yielding compounds which may be used in the practice of the present invention are tertiary butyl hypochlorite, trichloroisocyanuric acid, N-chlorophthalimide, N-iodosuccinimide, N-bromosuccinimide, and N-bromoacetamide. Throughout this application the symbol $RX^\oplus$ will be used to indicate the positive halogen yielding compound and is intended to cover the above as well as any other known source of positive halogen. X in the formula represents chlorine, bromine, and iodine.

Organic olefinically unsaturated compounds which can be used as starting materials in the process of this invention include monoolefins such as propylene, 1-butene, 1-pentene, 2-pentene, 3-pentene, 1-hexene, 2-hexene, 3-hexene, 4-hexene, 9-octadecene, 9-hexadecene, 4-methyl-1-butene, 4-ethyl-1-butene, 4-phenyl-1-butene, 3-methyl-1-pentene, 3-(2-othylphenyl)-1-pentene, 2-phenylethyl-2-hexene, 1-(2-tolylbutyl)-1-hexene, cyclopentene, cyclohexene, cycloheptene, cyclooctene, 3-methyl-1-cyclohexene, 4-ethyl-1-cyclohexene, 3-phenyl-1-cyclohexene, 4-(penylethyl)-1-cyclohexene or the like; diolefins including conjugated and non-conjugated diolefins such a 1,4-butadiene, 1,3-butadiene, 1,3-, 1,4-, or 1,5-pentadiene, 4-vinyl-1-cyclo-hexene, 1,3 - cyclopentadiene, dicyclopentadiene-structural formula:

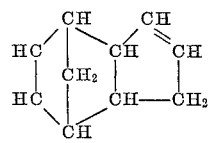

bicycloheptadiene, 1-methyl-1, 3-butadiene, 1-phenyl-1, 3-butadine, 6,10-hexadecadine, 2,4-hexadine, 9,12-octadecadine, or the like; 1,3,5-hexatriene, 1,3,5- or 1,3,6-heptatriene, etc; and other polyolefinically unsaturated compounds, e.g., terpene hydrocarbons such as alpha- and beta-pinene, containing a plurality of characteristic groupings of the general formula II above. Also suitable as starting materials in the practice of this invention are animal and vegetable oils which have one or more (usually a large number) of the required characteristic olefinic groupings. Such oils include for example almond oil, castor oil, coconut oil, corn oil, cottonseed oil, linseed oil, olive oil, palm oil, peanut oil, safflower oil, soybean oil, walnut oil or the like.

The reaction involved in performing the process of this invention is typified by the following equation where cyclohexene is chosen as the olefinically unsaturated starting materials:

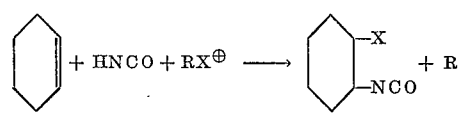

As noted above, the isocyanic acid and the positive halogen yielding compound ($RX^\oplus$) reactants must be used in amounts of at least one positive halogen equivalent for each group of the formula

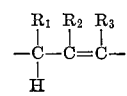

present in the olefin starting material. Excess amounts of isocyanic acid or of $RX^\oplus$ may be used if desired but ordinarily do not result in any significant advantage, although slight improvements in yield can be obtained by using excess isocyanic acid. Isocyanic acid, cyclohexene and $RX^\oplus$ have been reacted in mole equivalent ratios of from 1:1:1 up to 4:1:1 of the respective reactants with only a 5 to 10% increase in the overall yield at the latter ratio as compared to the former.

The reaction pressure is not critical. Since the reaction proceeds at a satisfactory rate at atmospheric pressure, such pressure is generally preferred. However, subatmospheric or superatmospheric pressures can be used if desired. It will be obvious that pressure should be sufficient in any case to preclude volatilization of the isocyanic acid reactant.

The process of this invention can be performed at temperatures in the range of from about minus 100° C. to about plus 60° C. Preferably the temperature of the reaction mass is maintained between about minus 100° C. and plus 20° C. Optimum reaction temperature and pressure for any particular vinyl compound starting material can be easily determined by routine empirical methods.

The reaction will usually be conducted in an inert liquid organic diluent. Suitable diluents include aliphatic, cycloaliphatic or aromatic hydrocarbons and halogen substituted hydrocarbons such as n-hexane, n-heptane, decane, benzene, toluene, xylene, carbon tetrachloride, chlorobenzene, cyclopentane, cyclohexane, trichlorobenzene or the like. The choice of any specific suitable diluent will be obvious to the skilled organic chemist. Because of its availability, economy, general utility, etc., the most particularly preferred diluent in toluene.

The chlorisocyanate produced in the process described above is separated and recovered by means known to those skilled in the art, e.g., distillation, filtration, centrifugation, extraction, etc., depending upon the state (i.e., solid or liquid) and the properties of the particular product.

The monochloromonoisocyanato compounds produced by the process of this invention are generally useful in those applications where known monoisocyanates are used, e.g., as treatment agents for textiles, paper, leather, etc.; and as intermediates for preparing a wide variety of other useful compounds. Because of their chlorine and nitrogen content the monoisocyanates are particularly useful as flamaproofing agents. Di-, tri-, and other polyisocyanates produced by the process of this invention are useful in the plastic and resin industries as precursors for preparing adhesive compositions, as well as solid and foamed polyurethanes, polyureas and other like polymers.

The invention will be further understood by referring to the following specific examples. These examples are furnished solely for the purposes of illustration.

Example I.—Preparation of 1-chloro-2-isocyanatocyclohexane

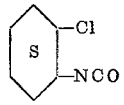

A mixture of 20.5 grams of cyclohexene with 358 grams of a 12 percent (by weight) solution of isocyanic acid in toluene (43 grams of acid) was formed in a 500 milliliter 3-necked flask equipped with a stirrer, thermometer and an addition funnel. The mixture was maintained at a temperature of minus 4° to minus 6° centigrade by external cooling of the flask with a dry ice bath and was continually stirred while a solution of 27.1 grams of tert-butyl hypochlorite in 50 milliliters of toluene was slowly added in a dropwise manner over a period of about two hours. The mole ratio of reactants thus was 1:1:4 (olefin to hypochlorite to isocyanic acid, respectively). After all of the hypochloriate was added, the reacting mass was permitted to warm up to room temperature. Toluene and unreacted starting materials were removed from the reaction mass by distilling at a pressure of 10 millimeters of mercury, absolute, and at tempeartures up to about 40° centigrade. The undistilled residue (43 grams) was flash distilled by dropwise addition to about 200 milliliters of stirred mineral oil contained in a 500 milliliter flask and maintained at a temperature of 90° centigrade and a pressure of 0.5 millimeter of mercury, absolute. Vapors from the flashing step were collected in a receiving flask which was cooled in a dry ice-acetone bath. Nineteen grams of 1-chloro-2-isocyanatocyclohexane product (48.8% yield based on cyclohexane) were recovered.

The liquid product had a boiling point of 66° centigrade at 1.5 millimeters of mercury absolute. It was shown by infrared analysis that the proposed structure was correct. Elemental analysis yielded the following results:

|  | Weight percent | |
| --- | --- | --- |
|  | Found | Theoretica |
| $C_7H_{10}NOCL$: |  |  |
| Carbon | 52.83 | 52.67 |
| Hydrogen | 6.52 | 6.31 |
| Nitrogen | 8.56 | 8.78 |
| Chlorine | 22.04 | 22.21 |

Example II

Further runs similar to that described in Example I were carried out. A 1:1:2 mole ratio of reactants (cyclohexane, tert-butyl hypochlorite and isocyanic acid) was used in each run with absolute quantities ranging from 0.2 to 1.0 moles. Reaction temperatures were maintained at about minus 78° C. in each run. The order of addition of the reactants was varied to cover all possible permutations without changing either the yield or the purity of the 1-chloro-2-isocyanatocyclohexene product. Distillation of the crude reaction product gave pure 1-chloro-2-isocyanatocyclohexene in yields of about 65–80% (based on cyclohexene). The product recovered in each case had the same boiling point and gave essentially the same elemental analysis as shown for the product of Example I.

Example III.—Reaction of isocyanic acid, tert-butyl hyporite and cyclic dienes

Isocyanic acid, tert-butyl hypochlorite and dicyclopentadiene in a mole ratio of 2:2:1, respectively, were reacted in the manner described in example I. Infrared and elemental analyses of the unrefined liquid product showed that it contained a chloroisocyanate having the probable formula:

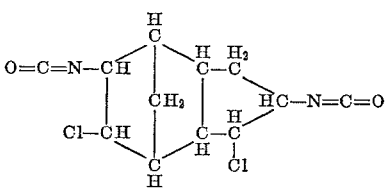

The yield of the above chloroisocyanate was about 45%, based on dicyclopentadiene reacted. The product is believed to consist of a mixture of position and endo and exo isomers.

Substitution of 1,3-cyclopentadiene for dicyclopentadiene in the above reaction yielded a liquid product which was shown by infrared analysis to contain a chloroisocyanate having the formula:

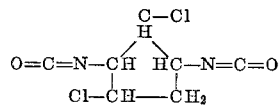

Example IV.—Reaction of isocyanic acid, tert-butyl hypochlorite and cottonseed oil Toluene (100 grams), 100 grams of a cottonseed oil having an iodine number of about 113 and 335 grams of a 11.2 percent (by weight) solution of isocyanic acid in toluene were placed in a 1000 milliter 3-necked flask equipped with a stirrer, thermometer and a dropping funnel. A solution of 81.4 grams of tert-butyl hypochlorite in 100 grams of toluene was added dropwise while the reaction mixture was stirred and maintained at a temperature of minus 5±1° centigrade. After completion of the hypochlorite addition the solution was permitted to warm up to room temperature. It was then allowed to stand for 60 hours at this temperature, during which time a precipitate was formed. The precipitate (27 grams) was filtered off and shown by analysis to be tert-butyl allophanate. The filtrate was heated to 50° C. under a pressure of 1 to 2 millimeters of mercury, absolute, to remove toluene. The remaining undistilled liquid was found, by infrared analysis, to be a beta-chloro-isocyanate derivative of the cottonseed oil starting material.

Example V.—Reaction of isocyanic acid, trichloroisocyanuric acid, and cyclohexene When cyclohexene (34 grams, 0.414 mole, diluted with 100 mls. of toluene) was added dropwise to a mixture of trichloroisocyanuric acid (32 g., 0.148 mole) and isocyanic acid (17.95 g., 0.414 mole) diluted to 240 mls. with toluene, the temperature of the cooled mixture rose from −70° C. to −49° C. during the addition. The mixture was then allowed to warm to −38° C. at which point an exothermic reaction carried the temperature up to −3° C. Analysis of the resulting solution, after solid cyanuric acid had been removed, by gas chromatography showed that approximately 30% of the cyclohexene had been converted to 1-chloro-2-isocyanatocyclohexane. The product was then purified by a vacuum distillation.

Example VI.—Reaction of isocyanic acid, t-butyl hypochlorite and cyclohexene at low temperatures The reaction of example I was run using the following quantities of reactants:

(1) 24 g. of HNCO in 200 mls. of toluene solution (0.558 mole)
(2) 22.9 g. of cyclohexene (0.279 mole)
(3) 30.3 g. of t-bu OCl (0.279).

The t-butyl hypochlorite was added to the other two reactants while the temperature of the solution was maintained at −97° C. The 1-chloro-2-isocyanatocyclohexene was isolated from this reaction by vacuum distillation.

B.P. 46° at 0.9 mm., $n_D^{20}$ 1.4799. Gas chromatographic analysis of this product showed a purity of 99%.

What is claimed is:

1. Process for producing 1-chloro-2-isocyanatocyclohexane which comprises reacting cyclohexene in an inert organic liquid diluent at a temperature in the range of from about minus 100° C. to about 60° C. with at least about one mole of isocyanic acid and at least about one mole of tertiary butyl hypochlorite permole of said cyclohexene.

2. Process as defined in claim 1 wherein said reaction temperature is in the range of from about minus 100° C. to about 20° C.

3. Process as defined in claim 2 wherein said diluent is toluene.

4. Process for producing 1-chloro-2-isocyanatocyclohexane which comprises reacting cyclohexene in toluene at a temperature in the range of from about minus 100° C. to about 20° C. with from about one to about four moles of isocyanic acid and about one mole of tertiary-butyl hypochlorite per mole of said cyclohexene, and recovering the 1-chloro-2-isocyanatocyclohexene product from the reaction mass.

5. Process for producing 1-chloro-2-isocyanatocyclohexane which comprises reacting cyclohexene in toluene at a temperature in the range of from about minus 100° C. to about 20° C. with from about one to about four moles of isocyanic acid and about ⅓ mole of trichloroisocyanic acid per mole of said cyclohexene, and recovering the 1-chloro-2-isocyanatocyclohexene product from the reaction mass.

References Cited

UNITED STATES PATENTS 2,977,369    3/1961    Dixon et al. _____ 260—453 XR

FOREIGN PATENTS 1,131,181    6/1962    Germany.

CHARLES B. PARKER, Primary Examiner

D. H. TORRENCE, Assistant Examiner

U.S. Cl. X.R.

23—151; 117—139.5, 142, 152; 260—25.5, 75, 77.5, 405.5, 666, 668, 675.5, 680